United States Patent
Bjorkengren

(10) Patent No.: US 11,022,444 B1
(45) Date of Patent: *Jun. 1, 2021

(54) DATASET SIMPLIFICATION OF MULTIDIMENSIONAL SIGNALS CAPTURED FOR ASSET TRACKING

(71) Applicant: Geotab Inc., Oakville (CA)

(72) Inventor: Ulf Bjorkengren, Helsingör (DK)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,064

(22) Filed: Jul. 14, 2020

Related U.S. Application Data

(60) Provisional application No. 63/039,480, filed on Jun. 16, 2020.

(51) Int. Cl.
  *G01C 21/28* (2006.01)
  *G06F 16/9537* (2019.01)
  *G06F 17/11* (2006.01)

(52) U.S. Cl.
  CPC ......... *G01C 21/28* (2013.01); *G06F 16/9537* (2019.01); *G06F 17/11* (2013.01)

(58) Field of Classification Search
  CPC .............................. G06F 16/254; G06F 17/11
  See application file for complete search history.

(56) References Cited

U.S. PATENT DOCUMENTS

| | | | |
|---|---|---|---|
| 4,936,678 A | 6/1990 | Gordon | |
| 5,173,691 A | 12/1992 | Sumner | |
| 5,225,842 A | 7/1993 | Brown et al. | |
| 5,311,197 A | 5/1994 | Sorden et al. | |
| 5,758,313 A | 5/1998 | Shah et al. | |
| 5,815,093 A | 9/1998 | Kikinis | |
| 5,844,473 A | 12/1998 | Kaman | |
| 5,884,216 A | 3/1999 | Shah et al. | |
| 5,919,239 A | 7/1999 | Fraker | |
| 5,922,040 A | 7/1999 | Prabhakaran | |
| 6,002,982 A | 12/1999 | Fry | |
| 6,088,648 A | 7/2000 | Shah et al. | |

(Continued)

OTHER PUBLICATIONS

Wikipedia: RDP <https://en.wikipedia.org/w/index.php?title=Ramer-Douglas-Peucker_algorithm&oldid=942730100> Feb. 26, 2020 version. (Year: 2020).*

(Continued)

*Primary Examiner* — Alexander Satanovsky
*Assistant Examiner* — Mark I Crohn
(74) *Attorney, Agent, or Firm* — Wolf, Greenfield & Sacks, P.C.

(57) ABSTRACT

Methods, systems, and devices for dataset simplification of multidimensional signals captured for asset tracking are provided. An example method involves obtaining raw data from a data source onboard an asset and determining whether obtainment of the raw data results in satisfaction of a data logging trigger. The method further involves, when the data logging trigger is satisfied, performing a dataset simplification algorithm on a target set of data within the raw data to generate a simplified set of data, wherein the target set of data contains a time-variant multidimensional signal and the dataset simplification algorithm is generalized for any multidimensional signal. The method further involves transmitting the simplified set of data to a server.

20 Claims, 6 Drawing Sheets

(56) References Cited

U.S. PATENT DOCUMENTS

| | | | |
|---|---|---|---|
| 6,131,066 A | 10/2000 | Ahrens | |
| 6,211,820 B1 | 4/2001 | Zou | |
| 6,240,294 B1 | 5/2001 | Hamilton et al. | |
| 6,282,362 B1 | 8/2001 | Murphy | |
| 6,285,953 B1 | 9/2001 | Harrison | |
| 6,363,320 B1 | 3/2002 | Chou | |
| 6,388,581 B1 | 5/2002 | Barker | |
| 6,389,340 B1 | 5/2002 | Rayner | |
| 6,434,631 B1 | 8/2002 | Bruno | |
| 6,473,030 B1 | 10/2002 | McBurney et al. | |
| 6,493,631 B1 | 12/2002 | Burns | |
| 6,526,341 B1 | 2/2003 | Bird et al. | |
| 6,542,077 B2 | 4/2003 | Joao | |
| 6,556,905 B1 | 4/2003 | Mittelsteadt et al. | |
| 6,636,790 B1 | 10/2003 | Lightner et al. | |
| 6,646,594 B1 | 11/2003 | Barber et al. | |
| 6,718,239 B2 | 4/2004 | Rayner | |
| 6,845,318 B1 | 1/2005 | Moore et al. | |
| 6,865,457 B1 | 3/2005 | Mittelsteadt et al. | |
| 6,922,133 B2 | 7/2005 | Wolfe | |
| 7,085,576 B2 | 8/2006 | Ranganathan | |
| 7,123,188 B2 | 10/2006 | Needham | |
| 7,155,376 B2 | 12/2006 | Yang | |
| 7,468,661 B2 | 12/2008 | Petite et al. | |
| 7,538,690 B1 | 5/2009 | Kaplan et al. | |
| 7,693,662 B2 | 4/2010 | Yamada | |
| 8,032,276 B2 | 10/2011 | Cawse | |
| 8,670,928 B2 | 3/2014 | Cawse | |
| 8,706,348 B2 | 4/2014 | Beams et al. | |
| 10,706,605 B1 * | 7/2020 | Russo | G06T 13/80 |
| 2001/0047244 A1 | 11/2001 | Harrison et al. | |
| 2002/0049529 A1 | 4/2002 | Ikeda | |
| 2002/0190851 A1 | 12/2002 | Skibinski | |
| 2003/0040272 A1 | 2/2003 | Lelievre | |
| 2003/0149530 A1 | 8/2003 | Stopczynski | |
| 2003/0169161 A1 | 9/2003 | Brown | |
| 2003/0169185 A1 | 9/2003 | Taylor | |
| 2004/0119612 A1 | 6/2004 | Chen | |
| 2004/0181495 A1 | 9/2004 | Grush | |
| 2004/0192342 A1 | 9/2004 | Ranganathan | |
| 2004/0239488 A1 | 12/2004 | Douglass et al. | |
| 2005/0065711 A1 | 3/2005 | Dahlgren et al. | |
| 2005/0171663 A1 | 8/2005 | Mittelsteadt et al. | |
| 2006/0119507 A1 | 6/2006 | Cawse | |
| 2006/0176193 A1 | 8/2006 | Wraight | |
| 2006/0184013 A1 | 8/2006 | Emanuel | |
| 2007/0073450 A1 | 3/2007 | Ampunan et al. | |
| 2008/0221776 A1 | 9/2008 | McClellan | |
| 2008/0252487 A1 | 10/2008 | McClellan et al. | |
| 2008/0255722 A1 | 10/2008 | McClellan et al. | |
| 2008/0258890 A1 | 10/2008 | Follmer et al. | |
| 2008/0262670 A1 | 10/2008 | McClellan et al. | |
| 2008/0294690 A1 | 11/2008 | McClellan et al. | |
| 2009/0051510 A1 | 2/2009 | Follmer et al. | |
| 2011/0130916 A1 | 6/2011 | Mayer | |
| 2011/0202305 A1 | 8/2011 | Willis et al. | |
| 2011/0239789 A1 | 10/2011 | Takahashi et al. | |
| 2011/0286302 A1 | 11/2011 | Welker et al. | |
| 2012/0010810 A1 | 1/2012 | Cawse | |
| 2012/0123632 A1 | 5/2012 | Nejah | |
| 2012/0303203 A1 | 11/2012 | Olsen et al. | |
| 2013/0013347 A1 | 1/2013 | Ling et al. | |
| 2014/0040324 A1 | 2/2014 | Marcolino et al. | |
| 2016/0186562 A1 | 6/2016 | Lee et al. | |
| 2016/0212589 A1 | 7/2016 | Cawse et al. | |
| 2017/0023379 A1 * | 1/2017 | El-Ghazal | G01C 17/38 |
| 2017/0149601 A1 | 5/2017 | Cawse et al. | |
| 2017/0161965 A1 | 6/2017 | Du et al. | |
| 2017/0250855 A1 | 8/2017 | Patil et al. | |
| 2017/0309092 A1 | 10/2017 | Rosenbaum | |
| 2018/0112990 A1 * | 4/2018 | Fowe | G01C 21/3484 |
| 2018/0179888 A1 | 6/2018 | Switzer et al. | |
| 2019/0196501 A1 | 6/2019 | Lesher et al. | |
| 2020/0118355 A1 * | 4/2020 | Soda | G07C 5/008 |
| 2020/0145304 A1 | 5/2020 | Wulff et al. | |

OTHER PUBLICATIONS

Wikipedia: On-board diagnostics <https://en.wikipedia.org/w/index.php?title=On-board_diagnostics&oldid=959687904#Vehicle_telematics> May 30, 2020 version. (Year: 2020).*
Wikipedia: GPS <https://en.wikipedia.org/w/index.php?title=Global_Positioning_System&oldid=959561822> May 29, 2020 version. (Year: 2020).*
U.S. Appl. No. 17/083,972, filed Oct. 29, 2020, Sukhov et al.
U.S. Appl. No. 17/084,008, filed Oct. 29, 2020, Sukhov et al.
U.S. Appl. No. 17/084,062, filed Oct. 29, 2020, Sukhov et al.
U.S. Appl. No. 17/084,086, filed Oct. 29, 2020, Sukhov et al.
U.S. Appl. No. 16/928,071, filed Jul. 14, 2020, Bjorkengren.

* cited by examiner

DATASET SIMPLIFICATION OF MULTIDIMENSIONAL SIGNALS CAPTURED FOR ASSET TRACKING

CROSS-REFERENCE

This application claims the benefit under 35 U.S.C § 1.119(e) to U.S. Provisional Application Ser. No. 63/039,480, titled "Dataset Simplification of Multidimensional Signals Captured by Asset Tracking Devices", filed Jun. 16, 2020, which is herein incorporated by reference in its entirety.

FIELD

The present disclosure relates to telematics, and in particular to the collection of data for asset tracking for telematics systems.

BACKGROUND

A telematics system may track the location of an asset, such as a vehicle, and other data related to the asset, directly through the asset or through an asset tracking device located onboard the asset. The asset, or its asset tracking device, may communicate with a satellite navigation system, such as a Global Positioning System (GPS), Global Navigation Satellite System (GNSS), cellular tower network, Wi-Fi network, or other system to track the location of the asset. An asset tracking device may collect additional information via sensors on the asset tracking device, such as accelerometer data or other data. An asset tracking device may also collect information through a data connection with the asset itself, such as, in the case of a vehicular asset, through an onboard diagnostic port from which engine speed, battery temperature, fuel level, tire pressure, outside temperature, or other asset data may be obtained. Such data may be received and recorded by technical infrastructure of the telematics system and used in the provision of telematics services, such as fleet management tools, or for further data analysis.

SUMMARY

According to an aspect of the disclosure, a method for capturing raw data that contains a multidimensional signal at an asset or asset tracking device for transmission to a telematics system is provided. The method involves obtaining raw data from a data source onboard an asset and determining whether obtainment of the raw data results in satisfaction of a data logging trigger. When the data logging trigger is satisfied, a dataset simplification algorithm is performed on a target set of data within the raw data to generate a simplified set of data, wherein the target set of data contains a time-variant multidimensional signal and the dataset simplification algorithm is generalized for any multidimensional signal. The method further involves transmitting the simplified set of data to a server.

Performing the dataset simplification algorithm may involve applying a dimensionally generalized Ramer-Douglas-Peucker algorithm to the target set of data to select points in the target set of data for inclusion in the simplified set of data that have minimum distances to a reference line running through the target set of data that exceed a threshold value, wherein each minimum distance is achieved by a direct calculation. Determination of a minimum distance for a sample point in the target set of data to the reference line may be achieved by determining a reference point on the reference line that is minimally distant from that sample point by evaluating $t_{min}$ in the following equation:

$$t_{min} = \frac{t_p + \sum_{n=1}^{N}(y_{p_n} - y_{0_n}) * a_n}{1 + \sum_{n=1}^{N} a_n^2}$$

wherein $t_p$ represents the time value (t) at the sample point (p), N represents the total number of non-time dimensions in the multidimensional signal, n represents the $n^{th}$ non-time dimension in the multidimensional signal, $y_{p_n}$ represents the value (y) of the sample point (p) in the $n^{th}$ dimension (n), $y_{0_n}$ represents the value (y) of the first point (0) in the $n^{th}$ dimension (n), the first point (0) being first with respect to time, $a_n$ represents the slope (a) of the reference line in the $n^{th}$ dimension (n) with respect to time, and $t_{min}$ represents the time (t) at the reference point, the point at which the reference line is minimally distant (min) from the sample point, and determining the distance from that sample point to the reference point by the following equation:

$$|R(L, p)| = \sqrt{(t_{min} - t_p)^2 + \sum_{n=1}^{N}(y_{0_n} + a_n * t_{min} - y_{p_n})^2}$$

wherein $t_{min}$, $t_p$, N, n, $y_{0_n}$, $a_n$, and $y_{p_n}$ are defined as in the previous equation, and $|R(L,p)|$ represents the distance (R) from the sample point (p) to the reference point on the reference line (L).

Performing the dataset simplification algorithm may involve: (i) defining a reference line through the target set of data from a first point in the set to a last point in the set with respect to time, (ii) determining a minimum distance to the reference line for all points in the target set of data between the first point and the last point, wherein determination of the minimum distance is a dimensionally generalized and direct calculation, (iii) selecting the point that has the largest minimum distance to the reference line, (iv) if the minimum distance from the selected point to the reference line is larger than a threshold value, logging the selected point for inclusion in the simplified set of data, and (v) repeating steps (i) through (iv) on subdivided portions of the set, each of which is bounded by the first point in the set, a to-be-saved point, or the last point in the set, as the case may be, using, for each subdivided portion, a line defined between the first point and the last point of that subdivided portion as a respective reference line for that subdivided portion, until there are no points in any subdivided portion that are minimally distant from the respective reference line of that subdivided portion by at least the threshold value.

The multidimensional signal may contain at least two data types that are recorded in different units, and the method further may include scaling the units of at least one dimension of the multidimensional signal prior to application of the dataset simplification algorithm. The two data types that are recorded in different units may be obtained from different data sources.

The multidimensional signal may include a first dimension for latitudinal position of the asset and a second dimension for longitudinal position of the asset. The multidimensional signal may further include a third dimension for altitudinal position of the asset. The multidimensional signal may include a first dimension for an accelerometer signal in an X direction, a second dimension for an accelerometer signal in a Y direction, and a third dimension for an accelerometer signal in a Z direction. The raw data may be obtained by an asset tracking device onboard the asset, and the data source may include one or more of: an onboard diagnostic port of the asset and a sensor of the asset tracking device.

According to another aspect of the disclosure, an asset tracking device that captures raw data that contains a multidimensional signal for transmission to a telematics system is provided. The asset tracking device includes an interface layer to obtain raw data from a data source onboard an asset, wherein the raw data contains a target set of data that contains a time-variant multidimensional signal. The asset tracking device further includes a memory to store the raw data, and a controller to determine whether obtainment of the raw data results in satisfaction of a data logging trigger, and when the data logging trigger is satisfied, perform a dataset simplification algorithm on the target set of data to generate a simplified set of data, wherein the dataset simplification algorithm is generalized for any multidimensional signal. The asset tracking device further includes a communication interface to transmit the simplified set of data to a server.

The multidimensional signal may contain at least two data types that are recorded in different units, and the units of at least one dimension of the multidimensional signal are scaled prior to application of the dataset simplification algorithm. The two data types that are recorded in different units may be obtained from different data sources. A first data type of the two data types may be a positional data type and a second data type of the two data types may be a speed data type. The asset may be a vehicle, the positional data type may be obtained from a locating device onboard the asset tracking device, and the speed data type may be obtained through an onboard diagnostic port of the vehicle.

According to yet another aspect of the disclosure, a system for capturing data from an asset tracking device is provided. System includes an asset tracking device onboard an asset, the asset tracking device configured to obtain raw data from a data source onboard the asset, wherein the raw data contains a target set of data that contains a time-variant multidimensional signal, determine whether obtainment of the raw data results in satisfaction of a data logging trigger, and when the data logging trigger is satisfied, perform a dataset simplification algorithm on the target set of data to generate a simplified set of data, wherein the dataset simplification algorithm is generalized for any multidimensional signal, and transmit the simplified set of data. The system further includes one or more servers to receive the simplified set of data from the asset tracking device, and record the simplified set of data in an asset tracking database.

The multidimensional signal may contain at least two data types that are recorded in different units, and the units of at least one of the dimensions of the multidimensional signal may be scaled prior to application of the dataset simplification algorithm. The two data types that are recorded in different units may be obtained from different data sources. A first data type of the two data types may be a positional data type and a second data type of the two data types may be a speed data type. The asset may be a vehicle, the positional data type may be obtained from a locating device onboard the asset tracking device, and the speed data type may be obtained through an onboard diagnostic port of the vehicle.

According to yet another aspect of the disclosure, another method for capturing raw data that contains a multidimensional signal at an asset or asset tracking device for transmission to a telematics system is provided. The method involves obtaining raw data from a data source onboard an asset, determining whether obtainment of the raw data results in satisfaction of a data logging trigger, and, when the data logging trigger is satisfied, performing a dataset simplification algorithm on a target set of data within the raw data to generate a simplified set of data, wherein the target set of data contains a time-variant N-dimensional signal, N>=1, and the dataset simplification algorithm is generalized for all N>=1, and transmitting the simplified set of data to a server.

Performing the dataset simplification algorithm may involve applying a dimensionally generalized Ramer-Douglas-Peucker algorithm to the target set of data to select points in the target set of data for inclusion in the simplified set of data that have minimum distances to a reference line running through the target set of data that exceed a threshold value, wherein determination of each minimum distance is direct for all N>=1. Determination of each minimum distance for a sample point in the target set of data to the reference line may be achieved by determining a reference point on the reference line that is minimally distant from that sample point by evaluating $t_{min}$ in the following equation:

$$t_{min} = \frac{t_p + \sum_{n=1}^{N}(y_{p_n} - y_{0_n}) * a_n}{1 + \sum_{n=1}^{N} a_n^2}$$

wherein, $t_p$ represents the time value (t) at the sample point (p), N represents the total number of non-time dimensions in the N-dimensional signal, n represents the $n^{th}$ dimension in the N-dimensional signal, $y_{p_n}$ represents the value (y) of the sample point (p) in the $n^{th}$ dimension (n), $y_{0_n}$ represents the value (y) of the first point (0) in the $n^{th}$ dimension (n), the first point (0) being first with respect to time, $a_n$ represents the slope (a) of the reference line in the $n^{th}$ dimension (n) with respect to time, and $t_{min}$ represents the time (t) at the reference point, the point at which the reference line is minimally distant (min) from the sample point, and determining the distance from that sample point to the reference point by the following equation:

$$|R(L, p)| = \sqrt{(t_{min} - t_p)^2 + \sum_{n=1}^{N}(y_{0_n} + a_n * t_{min} - y_{p_n})^2}$$

wherein, $t_{min}$, $t_p$, N, n, $y_{0_n}$, $a_n$, and $y_{p_n}$ are defined as in the previous equation, and |R(L,p)| represents the distance (R) from the sample point (p) to the reference point on the reference line (L).

Performing the dataset simplification algorithm may involve: (i) defining a reference line through the target set of data from a first point in the set to a last point in the set with respect to time, (ii) determining a minimum distance to the reference line for all points in the target set of data between the first point and the last point, wherein determination of the minimum distance is a dimensionally generalized and direct calculation, (iii) selecting the point that has the largest minimum distance to the reference line, (iv) if the minimum distance from the selected point to the reference line is larger than a threshold value, logging the selected point for inclusion in the simplified set of data, and (v) repeating steps (i) through (iv) on subdivided portions of the set, each of which is bounded by the first point in the set, a to-be-saved point, or the last point in the set, as the case may be, using, for each subdivided portion, a line defined between the first point and the last point of that subdivided portion as a respective reference line for that subdivided portion, until there are no points in any subdivided portion that are minimally distant from the respective reference line of that subdivided portion by at least the threshold value.

The N-dimensional signal may contain at least two data types that are recorded in different units, and the method may further involve scaling the units of at least one dimension of the multidimensional signal prior to application of the dataset simplification algorithm. The two data types that are recorded in different units may be obtained from different data sources. The N-dimensional signal may include a first dimension for latitudinal position of the asset and a second dimension for longitudinal position of the asset. The N-dimensional signal may further include a third dimension for altitudinal position of the asset. The N-dimensional signal may include a first dimension for an accelerometer signal in an X direction, a second dimension for an accelerometer signal in a Y direction, and a third dimension for an accelerometer signal in a Z direction. The raw data may be obtained by an asset tracking device onboard the asset, and the data source may include one or more of: an onboard diagnostic port of the asset and a sensor of the asset tracking device.

According to yet another aspect of the disclosure, another asset tracking device that captures raw data that contains a multidimensional signal for transmission to a telematics system is provided. The asset tracking device includes an interface layer to obtain raw data from a data source onboard an asset, wherein the raw data contains a target set of data that contains a time-variant N-dimensional signal, $N>=1$. The asset tracking device further includes a memory to store the raw data, and a controller to determine whether obtainment of the raw data results in satisfaction of a data logging trigger, and, when the data logging trigger is satisfied, perform a dataset simplification algorithm on the target set of data to generate a simplified set of data, wherein the dataset simplification algorithm is generalized for all $N>=1$, and a communication interface to transmit the simplified set of data to a server.

The N-dimensional signal may contain at least two data types that are recorded in different units, and the units of at least one of the dimensions of the multidimensional signal may be scaled prior to application of the dataset simplification algorithm. The two data types that are recorded in different units may be obtained from different data sources. A first data type of the two data types may be a positional data type and a second data type of the two data types may be a speed data type. The asset may be a vehicle, the positional data type may be obtained from a locating device onboard the asset tracking device, and the speed data type may be obtained through an onboard diagnostic port of the vehicle.

According to yet another aspect of the disclosure, another system for capturing data from an asset tracking device is provided. The system includes an asset tracking device onboard an asset, the asset tracking device configured to obtain raw data from a data source onboard the asset, wherein the raw data contains a target set of data that contains a time-variant N-dimensional signal, $N>=1$, determine whether obtainment of the raw data results in satisfaction of a data logging trigger, and, when the data logging trigger is satisfied, perform a dataset simplification algorithm on the target set of data to generate a simplified set of data, wherein the dataset simplification algorithm is generalized for all $N>=1$, and transmit the simplified set of data. The system further includes one or more servers to receive the simplified set of data from the asset tracking device, and record the simplified set of data in an asset tracking database.

The N-dimensional signal may contain at least two data types that are recorded in different units, and the units of at least one dimension of the multidimensional signal may be scaled prior to application of the dataset simplification algorithm. The two data types that are recorded in different units may be obtained from different data sources. A first data type of the two data types may be a positional data type and a second data type of the two data types may be a speed data type. the asset may be a vehicle, the positional data type may be obtained from a locating device onboard the asset tracking device, and the speed data type may be obtained through an onboard diagnostic port of the vehicle.

DETAILED DESCRIPTION

Figure 1:
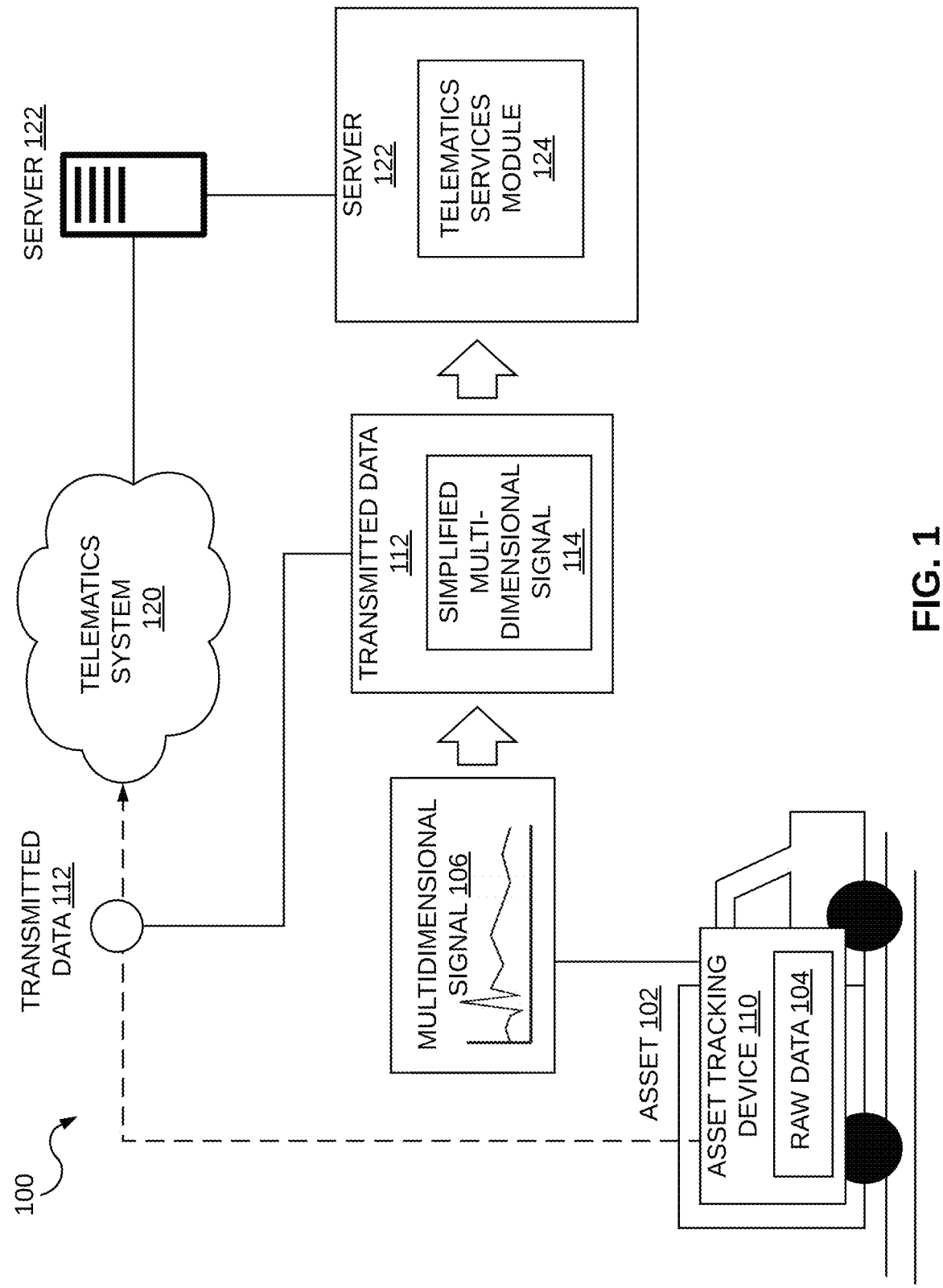
FIG. 1 is a schematic diagram of an example system for capturing data from an asset or asset tracking device. The asset or asset tracking device captures raw data that contains a multidimensional signal and simplifies the multidimensional signal for transmission to a telematics system.

A large telematics system may collect data from a very high number of assets, either directly or through asset tracking devices. A very high number of assets may be capable of collecting such large amounts of data that the technical infrastructure of a telematics system could be overwhelmed if all of the data were to be transmitted to, and processed by, the telematics system. Therefore, assets and asset tracking devices generally transmit only a small proportion of the total number of data points collected to their telematics system, and discard the remainder.

An asset or asset tracking device may determine which data points to transmit to its telematics system, and which data points to discard, directly on the device. The determination of which points to transmit, and which points to discard, may be made in a number of ways. In one simplistic example, one may employ simple periodic sampling, whereby only the data that is spaced apart by regularly spaced time intervals is retained for transmission, and all remaining data is discarded. Alternatively, in an improved example, one may algorithmically determine which points of data are the most significant for the purposes of a telematics service, and retain only these most significant data points for transmission. Applying a dataset simplification algorithm that retains only the most significant data points may ensure that the technical infrastructure of its telematics system is not overwhelmed with unnecessary amounts of data that is not useful in the provision of a telematics service.

Although the application of a dataset simplification algorithm may lead to data collection efficiencies for the telematics system that receives the data, the application of such algorithms may be computationally intensive for the asset or asset tracking device that collects the data, particularly in the case where the asset or asset tracking device collects many different types of data and performs a dataset simplification algorithm on each of these types of data independently.

The present disclosure provides techniques for applying a dataset simplification algorithm on raw data that is in the form of a multidimensional signal, and proposes that applying a dimensionally generalized dataset simplification algorithm on a multidimensional signal may be more computationally efficient as compared to the application of several instances of a unidimensional dataset simplification algorithm on the same data in the form of several separate sets of unidimensional signals. The term "signal" in this context refers to the signal of data types that are collected over time. That is, for example, it may be more computationally efficient to apply a dimensionally generalized dataset simplification algorithm on a three-dimensional accelerometer signal that comprises an accelerometer signal in the X direction, and accelerometer signal in the Y direction, and an accelerometer signal in the Z direction, over time, than it is to apply a unidimensional dataset simplification algorithm on the accelerometer signal in the X direction over time, the accelerometer signal in the Y direction over time, and again on the accelerometer signal in the Z direction over time. In general, such a multidimensional signal may be any bundle of signals that would otherwise be simplified independently.

Thus, an asset or asset tracking device may collect data of a plurality of different types, and perform dimensionally generalized dataset simplification algorithms on multidimensional signals within the data to simplify the data in a computationally efficient manner, prior to transmission to its telematics system. Further, by performing dataset simplification algorithms on bundles of signals that would have otherwise been simplified independently, the asset or asset tracking device may make more accurate determinations as to which points are the most significant points, which may result in more reliable data collection for its telematics system.

FIG. 1 is a schematic diagram of an example system 100 for capturing data from an asset or asset tracking device. In the present example, the system 100 includes an asset tracking device 110 located at an asset 102.

In some examples, the asset tracking device 110 may be a self-contained device installed at the asset 102. In other examples, the asset tracking device 110 may be a tracking device that is integrated into the asset 102, in which case the data captured by the asset tracking device 110 may be referred to as being captured by the asset 102 itself. In either case, the data captured may be referred to as being captured by an asset tracking device.

The asset tracking device 110 collects data, such as the location of the asset tracking device 110 or sensor data from sensors onboard the asset tracking device 110. In some examples, such as in the case where the asset 102 is a vehicle and the asset tracking device 110 is a separate device, the asset tracking device 110 may collect data directly from the asset 102 through an onboard diagnostic port. This data is indicated generally as raw data 104.

For collecting location data, the system 100 may include a locating system (not shown) for tracking the locations of one or more asset tracking devices, including the asset tracking device 110, such as a Global Positioning System (GPS), a Global Navigation Satellite System (GNSS), a cellular tower network, Wi-Fi networks, or another system which enables the monitoring of the location of asset tracking devices.

For exemplary purposes, the asset 102 is shown as a vehicular asset: a transport truck. However, the asset 102 may include any type of vehicular asset, such as a passenger vehicle, construction vehicle, other utility vehicle, naval vessel, airplane, or any other vehicular asset that may be tracked by an asset tracking device. The asset 102 may also include any non-vehicular asset, such as a transport trailer, shipping container, pallet, shipped good, or any other non-vehicular asset which may be tracked by an asset tracking device. Further, in other examples, the asset 102 may include a vehicle or other asset that includes an integrated tracking device to capture data related to the asset 102.

The system 100 further includes a telematics system 120 that includes an asset tracking database that may record location data, trip/travel histories, accelerometer data, temperature sensor data, vehicle speed data, and other data captured by assets and/or asset tracking devices, including the asset tracking device 110. The telematics system 120 may further store user accounts and other data associated with the asset tracking devices for the provision of telematics services.

The technical infrastructure of the telematics system 120 includes one or more servers or computing devices, indicated, for example, as a server 122. The server 122 includes a communication interface to communicate with asset tracking devices via one or more computing networks and/or telecommunication networks, a memory to store data, and a controller to execute the methods performed by the telematics system 120 as described herein. For example, the server 122 is shown to provision a telematics services module 124 which provides telematics services, such as asset tracking and reporting services, to client devices (not shown) using data collected from asset tracking devices.

A portion of the raw data 104 collected by the asset tracking device 110 is transmitted to the telematics system 120, indicated as transmitted data 112. The remainder of the raw data 104 that is not transmitted is discarded. The raw data 104 includes a multidimensional signal 106, which is simplified by the asset tracking device 110 into a simplified multidimensional signal 114 for inclusion in the transmitted data 112 by the application of a dimensionally generalized dataset simplification algorithm.

The multidimensional signal 106 is time-variant, and is a signal that includes multiple streams of raw data collected over time. For example, the multidimensional signal 106 may include a first dimension for an accelerometer signal in the X direction, a second dimension for an accelerometer signal in the Y direction, and a third dimension for an accelerometer signal in the Z direction, each of which are collected over time by the asset tracking device 110. As another example, the multidimensional signal 106 may include a first dimension for latitudinal position of the asset 102 and a second dimension for longitudinal position of the asset 102, and in some examples, a third dimension for an altitudinal position of the asset 102, each of which are collected over time by the asset tracking device 110. In other words, the multidimensional signal is a time-variant N-dimensional signal, with N>1, and the dataset simplification algorithm is generalized for all N>1.

The data types that are included in the multidimensional signal 106 may be of related data types that are recorded in the same units (such as in the case of a multidimensional accelerometer data signal, or in the case of a multidimensional positional data signal). However, in other examples, the multidimensional signal 106 may include a multitude of related and/or unrelated data types (e.g., a combination of accelerometer data, speed, location, engine data, etc.).

As will be seen below, any of these multidimensional signals may be processed through a dataset simplification algorithm that is generalized for any dimensionality (for all N>1) to improve the computational efficiency of the simplification of such data. As will be seen below, performing the dataset simplification algorithm on the multidimensional signal 106 rather than on several unidimensional signals independently may improve processing performance of the asset tracking device 110, and may further improve the reliability of the collection of data by the telematics system 120. Example methods by which the asset tracking device 110 obtains and simplifies such data are discussed in greater detail below.

Further, in some examples, the dataset simplification algorithm may further be generalized for the case where the signal to be simplified is either unidimensional (N=1) or multidimensional (N>1), and the same generalized dataset simplification algorithm may be applied to a signal of any dimensionality (N>=1) thereby enabling the use of a common model for dataset simplification for all dimensions, which may improve the design, implementation, and maintenance of such systems.

Figure 2:
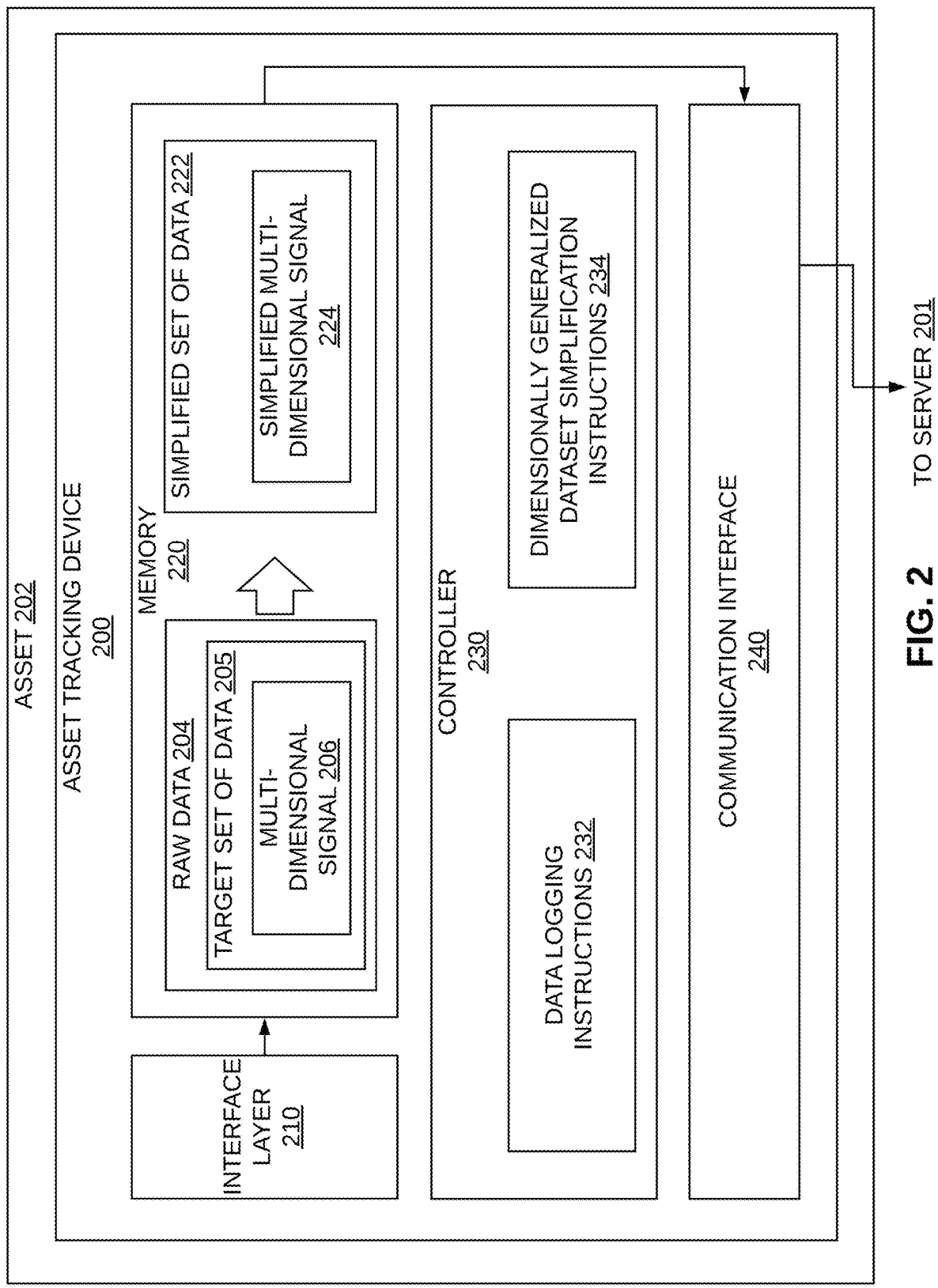
FIG. 2 is a block diagram of an example asset tracking device that captures raw data that contains a multidimensional signal for transmission to a telematics system.

FIG. 2 is a block diagram of an example asset tracking device 200 that collects and simplifies raw data that contains a multidimensional signal for transmission to a telematics system. The asset tracking device 200 may be understood to be one example of the asset tracking device 110 of FIG. 1.

The asset tracking device 200 is onboard an asset 202, which may be similar to the asset 102 of FIG. 1. As described above, the asset 202 may be a vehicular or non-vehicular asset.

The asset tracking device 200 includes an interface layer 210 to obtain raw data 204 from a data source onboard the asset 202. The data source may include a sensor of the asset tracking device 200, a sensor of the asset 202, a locating device of the asset tracking device 200 (e.g., a GPS device located on the asset tracking device 200), a locating device of the asset 202 (e.g., a GPS device located on the asset 202), or, in examples in which the asset 202 is a vehicle and the asset tracking device 200 is located onboard the asset 202, an onboard diagnostic port of the asset 202. In any case, the interface layer 210 obtains raw data 204 from such a data source and includes one or more interfaces for receiving raw data 204 from the data source.

The asset tracking device 200 further includes a memory 220 that stores at least a portion of the raw data 204 collected through the interface layer 210. The memory 220 may include read-only memory (ROM), random-access memory (RAM), flash memory, magnetic storage, optical storage, and similar, or any combination thereof. The memory 220 may include a raw data buffer to store the raw data 204, and a logging memory to store the data that is to-be-saved and transmitted to technical infrastructure of a telematics system, shown here as a server 201, which may be similar to the server 122 of FIG. 1.

The raw data 204 includes a subset that is to be simplified as a multidimensional signal, denoted herein as a target set of data 205. The target set of data 205 contains a time-variant multidimensional signal 206, similar to the multidimensional signal 106 as discussed above with respect to FIG. 1. The multidimensional signal 206 may include positional data, accelerometer data, or any other data that is to be simplified by a dataset simplification algorithm.

Although only a single target set of data 205 and multidimensional signal 206 are shown, this is for illustrative purposes only, and it is to be understood that the memory 220 may contain several target sets of data 205 and multidimensional signals 206, to be processed as discussed herein. Further, the amount of raw data 204 stored on the memory 220 at any given time may depend on a number of factors, such as the memory size of the memory 220, the frequency with which such data is to be logged, and the bandwidth available for such data to be transmitted to a telematics system.

The asset tracking device 200 further includes a controller 230 to execute data logging instructions 232 and dimensionally generalized dataset simplification instructions 234. The controller includes one or more of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 includes a memory, which may include ROM, RAM, flash memory, magnetic storage, optical storage, and similar, or any combination thereof, for storing instructions and data as discussed herein, including the data logging instructions 232 and dimensionally generalized dataset simplification instructions 234.

The data logging instructions 232 cause the controller 230 to determine whether obtainment of the raw data 204 results in satisfaction of a data logging trigger.

In some examples, determining whether obtainment of the raw data 204 results in satisfaction of a data logging trigger may involve monitoring the raw data 204 for a particular feature in the raw data 204. For example, a data logging trigger may be satisfied when the asset tracking device 200 determines from the raw data 204 that the asset 202 has either stopped or started moving. As another example, the asset tracking device 200 may continually monitor the trends in the data of any of its data types (e.g., position), and a data logging trigger may be satisfied when the asset tracking device 200 determines that, for any given data type, the actual collected data differs from the trend by a threshold amount. Thus, for example, when the asset 202 veers off course from its expected path of travel, a data logging trigger may be satisfied.

In other examples, determining whether obtainment of the raw data 204 results in satisfaction of a data logging trigger may involve monitoring an operating condition of the asset tracking device 200 for when a particular operating condition is met. For example, a data logging trigger may be satisfied when a hardware limitation of the asset tracking device 200 is met, such as, for example, when a raw data buffer reaches a limit to the amount of raw data it can store, when a timer expires, or based on telematics service standards, such as, for example, a frequency with which the data at the telematics system is to be updated.

When a data logging trigger is satisfied, the data logging instructions 232 cause the dimensionally generalized dataset simplification instructions 234 to be executed, and a dataset simplification algorithm is performed on a target set of data 205 to generate a simplified set of data 222. The target set of data 205 may or may not relate to the type of data monitored by the data logging trigger that was satisfied. That is, for example, if a data logging trigger related to the position of the asset 202 was satisfied, the dimensionally generalized dataset simplification instructions 234 may perform a dataset simplification algorithm on positional data. Alternatively, when a raw data buffer reaches its limit, the dimensionally generalized dataset simplification instructions 234 may be executed on all types of data stored therein.

The dimensionally generalized dataset simplification algorithm determines which data points in the multidimensional signal 206 should be retained in the simplified multidimensional signal 224 and logged for transmission to the server 201. That is, the dimensionally generalized dataset simplification algorithm determines which data points in the multidimensional signal 206 are most useful to providing a telematics service (i.e., to be saved), and which data points provide little useful information to a telematics service (i.e., to be discarded).

The dataset simplification algorithm may include a line simplification algorithm that reduces a curve of raw data composed of line segments (e.g., the multidimensional signal 206) into a similar curve with fewer points. An example of such a line simplification algorithm in its unidimensional form is the Ramer-Douglas-Peucker algorithm, which involves the application of a two-dimensional Pythagorean calculation to determine the distance from a sample point to a reference line running through the data. However, the dataset simplification algorithm performed by the dimensionality generalized dataset simplification instructions 234 is generalized for any multidimensional signal 206. In other words, the multidimensional signal 206 is a time-variant N-dimensional signal, with N>1, and the dataset simplification algorithm is generalized for all N>1.

One form of multidimensional dataset simplification algorithm that may be applied by the dimensionally generalized dataset simplification instructions 234 may be understood to be a modified Ramer-Douglas-Peucker algorithm that is modified to be dimensionally generalized. Such a modified Ramer-Douglas-Peucker algorithm may involve the application of a dimensionally-generalized Pythagorean calculation to determine the distance from a sample point to a reference line running through the data. However, other multidimensional dataset simplification algorithms are contemplated.

As mentioned, the dataset simplification algorithm is to be applied to the target set of data 205 to select points in the target set of data 205 for inclusion in the simplified set of data 222. In the example of a modified Ramer-Douglas-Peucker algorithm, the points for inclusion in the simplified set of data 222 have minimum distances to a reference line running through the target set of data 205 that exceed a threshold value. When modified to be dimensionally generalized, determination of the minimum distances is achieved by a direct calculation, discussed in greater detail in FIGS. 5A-6C, below, rather than by a series of calculations on a series of unidimensional calculations. Such a multidimensional algorithm may result in computational efficiencies and improved data logging reliability.

Further, in some examples, the dataset simplification algorithm may further be generalized for the case where the signal to be simplified is either unidimensional (N=1) or multidimensional (N>1), and the same generalized dataset simplification algorithm may be applied to a signal of any dimensionality (N>=1) thereby enabling the use of a common model for dataset simplification for all dimensions, which may improve the design, implementation, and maintenance of such systems. In such examples, in the application of a modified Ramder-Douglas-Peucker algorithm, the determination of the minimum distances is direct for all N>=1.

The asset tracking device 200 further includes a communication interface 240 to transmit the simplified set of data 222, which includes the simplified multidimensional signal 224, to the server 201. The communication interface 240 may include a cellular modem, such as an LTE-M modem, CAT-M modem, or other cellular modem configured for bidirectional communication via the network with which asset tracking device 200 may communicate with the server 201.

Figure 3:
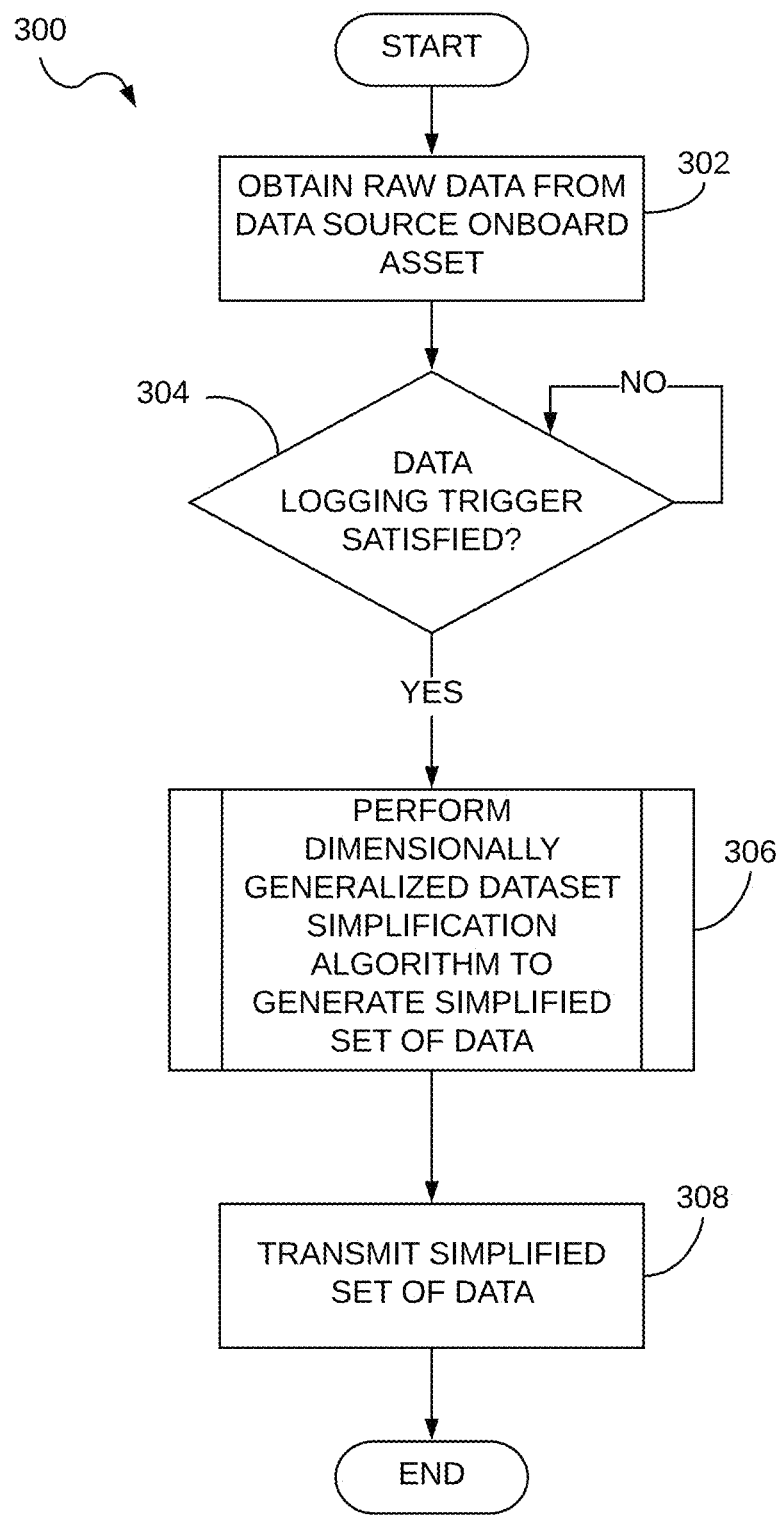
FIG. 3 is a flowchart of an example method for capturing raw data that contains a multidimensional signal at an asset or asset tracking device for transmission to a telematics system.

FIG. 3 is a flowchart of an example method 300 for collecting raw data at an asset or asset tracking device that contains a multidimensional signal, and simplifying the multidimensional signal for transmission to a telematics system. The method 300 may be understood to be one example of how the asset tracking device 200 of FIG. 2 collects and simplifies raw data containing a multidimensional signal. Thus, for exemplary purposes, the method 300 will be described with reference to the asset tracking device 200 of FIG. 2. Further, the blocks of the method 300 are elaborated upon above with reference to the appropriate components of the asset tracking device 200 of FIG. 2. However, it is to be understood that the method 300 may be applied by other assets and/or asset tracking devices.

At block 302, the interface layer 210 of the asset tracking device 200 obtains raw data 204 from a data source onboard the asset 202. As described above, the data source may include a sensor, locating device, or onboard diagnostic port of a vehicle.

At block 304, the controller 230 determines whether obtainment of the raw data 204 results in satisfaction of a data logging trigger. The data logging trigger is included in the data logging instructions 232. As described above, the data logging trigger is a trigger that determines when the raw data 204 is to be evaluated for simplification and logged for transmission to a telematics system.

At block 306, when the data logging trigger is satisfied, the controller 230 performs a dimensionally generalized dataset simplification algorithm on the target set of data 205 within the raw data 204 to generate the simplified set of data 222. The target set of data 205 contains the time-variant multidimensional signal 206, and the simplified set of data 222 contains the simplified multidimensional signal 224. In other words, the multidimensional signal 206 is a time-variant N-dimensional signal, with N>1, and the dataset simplification algorithm is generalized for all N>1. Further, in some examples, the dataset simplification algorithm may further be generalized for the case where the signal to be simplified is either unidimensional (N=1) or multidimensional (N>1), and the same generalized dataset simplification algorithm may be applied to a signal of any dimensionality (N>=1). In either case, the dataset simplification algorithm is generalized for any multidimensional signal 206. As described above, the dataset simplification algorithm determines which data points should be recorded for transmission to the telematics system and which data points should be discarded. The simplified set of data 222 is logged for transmission.

At block 308, the communication interface 240 transmits the simplified set of data 222 to the server 201. The simplified set of data 222 may be used in a telematics system as appropriate.

The method 300 may be embodied in instructions (such as the data logging instructions 232 and dimensionally generalized dataset simplification instructions 234) stored on a non-transitory machine-readable storage medium that is executable by the controller 230 to perform the method 300. The non-transitory machine-readable storage medium may include ROM, RAM, flash memory, magnetic storage, optical storage, and similar, or any combination thereof, for storing instructions and data as discussed herein.

Thus, a non-transitory machine-readable storage medium may contain instructions that when executed cause the controller 230 to obtain raw data 204 from a data source onboard the asset 202 and determine whether obtainment of the raw data 204 results in satisfaction of a data logging trigger. When the data logging trigger is satisfied, the instructions may cause the controller 230 to perform a dataset simplification algorithm on a target set of data 205 within the raw data 204. The target set of data 205 contains a time-variant multidimensional signal 206. The dataset simplification algorithm is to generate a simplified set of data 222 that contains a simplified multidimensional signal 224. The dataset simplification algorithm is generalized for any multidimensional signal. The instructions may further cause the controller 230 to transmit the simplified set of data 222 to the server 201.

Figure 4:
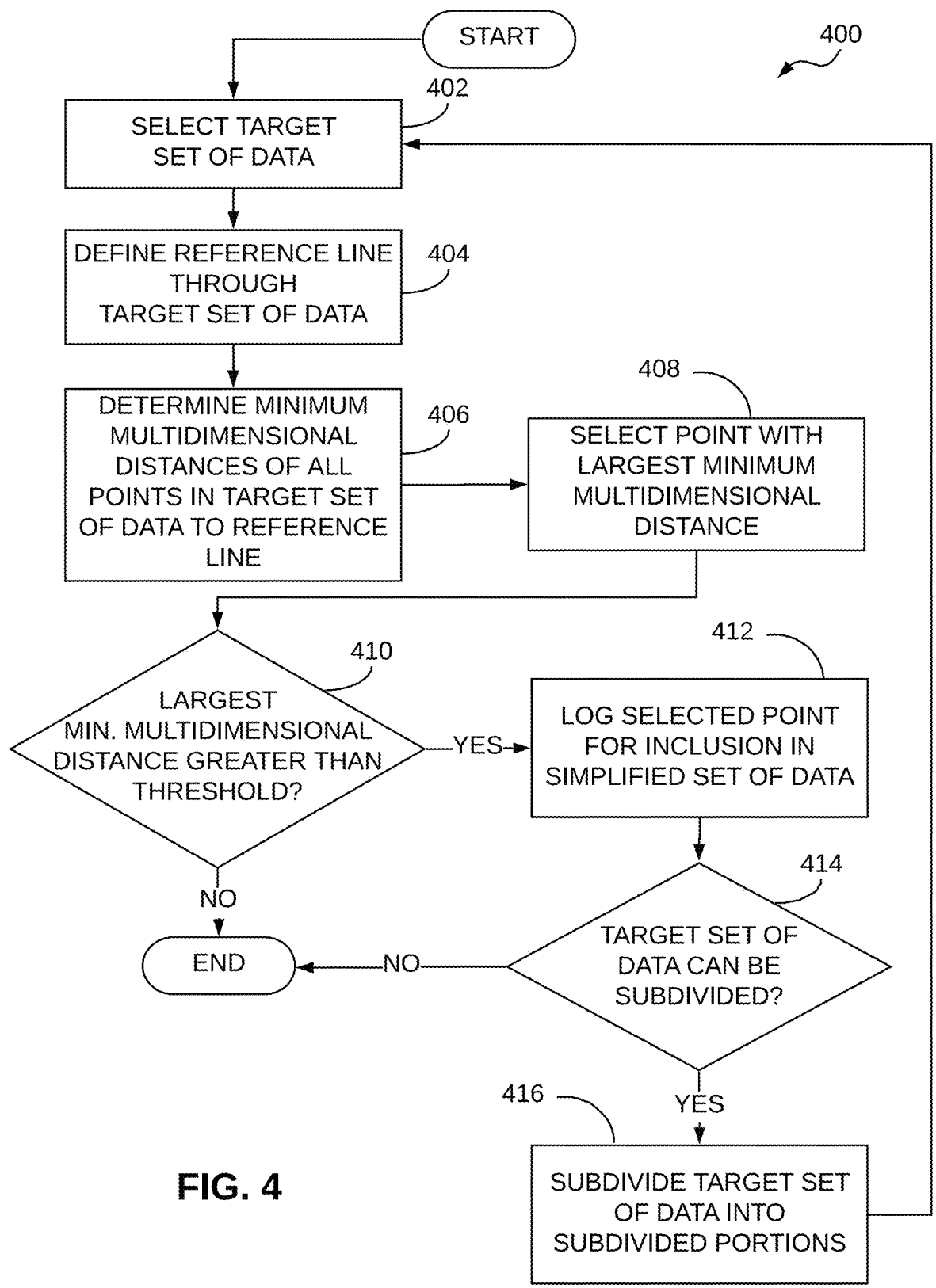
FIG. 4 is a flowchart of an example method for performing a dataset simplification algorithm on a set of data the contains a multidimensional signal.

FIG. 4 is a flowchart of an example method 400 for performing a dataset simplification algorithm on a set of data that contains a multidimensional signal. The method 400 may be understood to be one example of how a dimensionally generalized dataset simplification algorithm may be performed on raw data collected by an asset tracking device. For example, the method 400 may be understood to be one example of how the block 306 of the method 300 of FIG. 3 may be performed by the asset tracking device 200 of FIG. 2. Thus, for convenience, description of the method 400 is made with reference to the asset tracking device 200 of FIG. 2. However, this is not limiting, and the method 400 may be performed by other systems and/or devices.

The method 400 is illustrated as being applied on an example set of raw data in FIGS. 5A, 5B, 5C, 6A, 6B, and 6C. The example set of raw data shown may be understood to be one example of the target set of data 205 of FIG. 2. For illustrative purposes, description of the method 400 is also made with reference to this target set of data 205 in FIGS. 5A, 5B, 5C, 6A, 6B, and 6C. However, this is not limiting, and the method 400 may be performed on other sets of raw data.

Figure 5A:
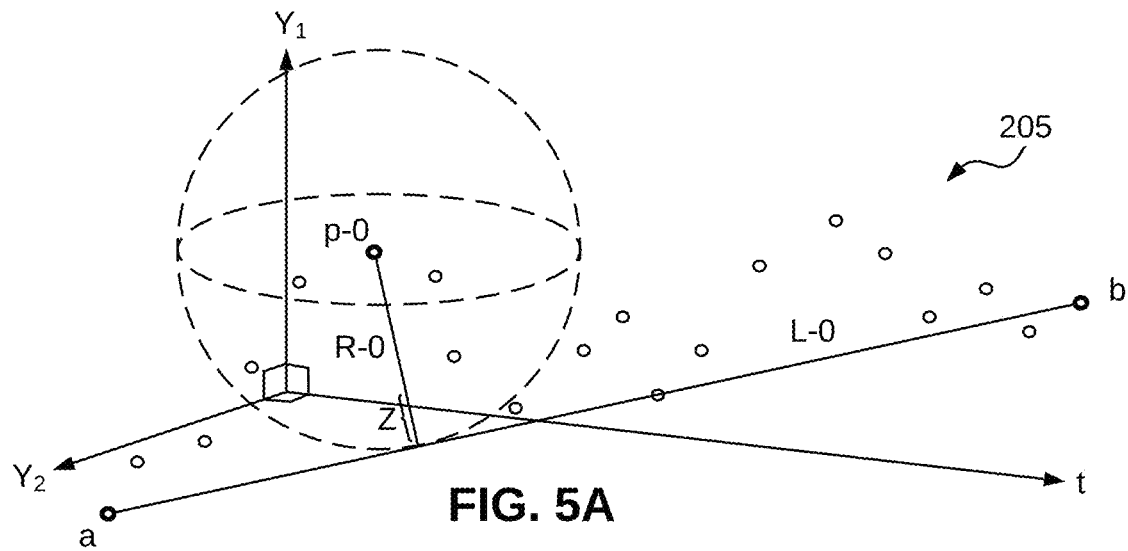
FIGS. 5A, 5B, 5C, 6A, 6B, and 6C are data plots that illustrate the application of a multidimensional dataset simplification algorithm to example raw data captured by an asset or asset tracking device.

At block 402, the controller 230 selects the target set of data 205 from the raw data 204. As described above, the target set of data 205 may be selected based on the data logging trigger that was satisfied. The target set of data 205 may be any set of data that includes some time-variant multidimensional signal 206 that is to be simplified prior to transmission to a telematics system. In some cases, the target set of data 205 may also be any subdivided portion of a higher level target set of data, as discussed below. With reference to FIG. 5A, the target set of data 205 includes a two-dimensional signal having dimensions ($Y_1$) and ($Y_2$) that vary with time (t). The target set of data 205 may be, for example, an X dimension of accelerometer data (e.g., ($Y_1$)) and a Y dimension of accelerometer data (e.g., ($Y_2$)) collected over time. As can be seen, the data points in the target set of data 205 vary with respect to ($Y_1$) and ($Y_2$) over time.

At block 404, a reference line is defined through the target set of data 205, from the first point in the set to the last point in the set with respect to time. With reference to FIG. 5A, the reference line (L-0) is defined through points (a) and (b), and travels through the three-dimensional space defined by ($Y_1$), ($Y_2$), and (t). The reference line (L-0) is a straight line running from point (a) to point (b). In some examples, the first and last points (a) and (b) may be marked as to-be-saved for inclusion in the simplified set of data 222.

In general, a reference line (L) is defined by the following equation:

$$L(t) = (y_{0_1} + a_1 * t, \ldots, y_{0_n} + a_n * t, \ldots, y_{0_N} + a_N *) \quad (1)$$

In the above equation (1), (t) represents time, ($y_{0_1}$) represents the value (y) of the first point (0) in the first dimension, ($a_1$) represents the slope (a) of the reference line in the first dimension with respect to time, ($y_{0_n}$) represents the value (y) of the first point (0) in the $n^{th}$ dimension (n), the first point (0) being first with respect to time, ($a_n$) represents the slope (a) of the reference line in the $n^{th}$ dimension (n) with respect to time, and (N) represents the total number of non-time dimensions in the multidimensional signal (i.e., two dimensions ($Y_1$) and ($Y_2$) in the target set of data 205).

At block 406, the controller 230 determines a minimum distance to the reference line for all points in the target set of data 205 between the first point and the last point. With reference to FIG. 5A, the controller 230 determines the distance from all points between points (a) and (b) to the reference line (L-0). The determination of a minimum distance from a sample point (p-0) to the reference line (L-0) is dimensionally generalized, and in this case, it is a three-dimensional distance calculated through the three-dimensional space defined by ($Y_1$), ($Y_2$), and (t).

In general, the determination of a minimum distance from any sample point (p) to a reference line (L) is also direct, in that it is achieved in a single step (i.e., by the application of a single mathematical equation). This direct multidimensional determination is in contrast to using a dataset simplification algorithm that acts on a unidimensional signal, such as the Ramer-Douglas-Peucker algorithm, to simplify a multidimensional signal.

In general, a reference point on a reference line (L) that is minimally distant from a sample point (p) to the reference line (L) may be determined, in a dimensionally generalized manner, by evaluating ($t_{min}$) in the following equation:

$$t_{min} = \frac{t_p + \sum_{n=1}^{N} (y_{P_n} - y_{0_n}) * a_n}{1 + \sum_{n=1}^{N} a_n^2} \quad (2)$$

In the above equation (2), ($t_p$) represents the time value (t) at the sample point (p), (N) represents the total number of non-time dimensions in the multidimensional signal (i.e., two dimensions ($Y_1$) and ($Y_2$) in the target set of data 205), (n) represents the $n^{th}$ dimension in the multidimensional signal, ($y_{P_n}$) represents the value (y) of the sample point (p) in the $n^{th}$ dimension (n), ($y_{0_n}$) represents the value (y) of the first point (0) in the $n^{th}$ dimension (n), the first point (0) being first with respect to time, ($a_n$) represents the slope (a) of the reference line in the $n^{th}$ dimension (n) with respect to time, and ($t_{min}$) represents the time (t) at the reference point, the point at which the reference line is minimally distant (min) from the sample point (p).

The above equation (2) is derived by differentiating the following equation with respect to time, which is a generalized equation to provide the distance from a sample point (p) to the reference line (L) at any level of dimensionality.

$$|R(L,p)| = \sqrt{(t - t_p)^2 + \sum_{n=1}^{N}(y_{0_n} + a_n * t - y_{P_n})^2} \quad (3)$$

In the above equation (3), (t), ($t_p$), (N), (n), ($y_{0_n}$), ($a_n$), and ($y_{p_n}$) are defined as in the previous equation (2), and $|R(L,p)|$ represents the distance (R) from the sample point (p) to the reference point on the reference line (L).

Evaluating equation (3) at the time ($t_{min}$) determined from equation (1) provides the minimum distance from a sample point (p) to a reference point on the reference line (L), generalized for any multidimensional signal, as shown in the equation below:

$$|R(L,p)| = \sqrt{(t_{min}-t_p)^2 + \Sigma_{n=1}^{N}(y_{0_n}+a_n*t_{min}-y_{p_n})^2} \quad (4)$$

Thus, the minimum distance from a sample point (p) to the reference line (L) is determined. This determination is made for all points in the target set of data 205. This determination is in contrast to using a dataset simplification algorithm that acts on a unidimensional data signal, such as the Ramer-Douglas-Peucker algorithm, to simplify a multidimensional signal.

The above equation (2) may be simplified for any (N), some examples of which are provided in Table 1 below. Alongside each of the simplified equations there is also provided the number of mathematical operations in that equation that cause high processor load ("HPL"). Mathematical operations that cause high processor load include multiplication, division, square roots, and squares, but exclude addition and subtraction.

may be included in the dimensionally generalized dataset simplification instructions 234. The dimensionally generalized dataset simplification instructions 234 may include instructions to analyze any given target set of data 205 to determine the number of dimensions in the multidimensional signal 206 therein, and to select an appropriate equation to use for the multidimensional signal 206 based on its number of dimensions.

As can be seen from Table 1 and Table 2, the number of HPL operations increases with N for equation (2) and equation (4). However, the number of HPL operations to perform either equation for any N>1 is lower than the number of HPL operations that would be required to perform the same equation N times when N=1. For example, five HPL operations are performed by equation (2) when N=2, but six HPL operations are performed if equation (2) is performed twice when N=1. Thus, it is less computationally intensive on a processor to perform equation (2) with N=2 (i.e., when simplifying a multidimensional signal of N=2) than it is to perform equation (2) twice when N=1 (i.e., when simplifying two separate unidimensional signals of each N=1). Similar computational savings are provided by equation (4) as well. Further, as will be seen below, the distance from each data point in the target set of data 205 may be compared against a single threshold value (Z) to determine whether or not the point is to be saved for inclusion in the

| (N) | Equation (2) simplified for example values of (N) | HPL OPERATIONS |
|---|---|---|
| 1 | $t_{min} = \dfrac{t_p + (y_{p_1} - y_{0_1})*a_1}{1 + a_1^2}$ | 3 |
| 2 | $t_{min} = \dfrac{t_p + (y_{p_1} - y_{0_1})*a_1 + (y_{p_2} - y_{0_2})*a_2}{1 + a_1^2 + a_2^2}$ | 5 |
| 3 | $t_{min} = \dfrac{t_p + (y_{p_1} - y_{0_1})*a_1 + (y_{p_2} - y_{0_2})*a_2 + (y_{p_3} - y_{0_3})*a_3}{1 + a_1^2 + a_2^2 + a_3^2}$ | 7 |

Further, the above equation (4) may be simplified for any (N), some examples of which are provided in Table 1 below. Similarly, alongside each of the simplified equations there is also provided the number of mathematical operations in that equation that cause high processor load.

| (N) | Equation (4) simplified for example values of (N) | HPL OPERATIONS |
|---|---|---|
| 1 | $|R(L,p)| = \sqrt{(t_{min}-t_p)^2 + (y_{0_1} + a_1*t_{min} - y_{p_1})^2}$ | 4 |
| 2 | $|R(L,p)| = \sqrt{(t_{min}-t_p)^2 + (y_{0_1} + a_1*t_{min} - y_{p_1})^2 + (y_{0_2} + a_2*t_{min} - y_{p_2})^2 +}$ | 6 |
| 3 | $|R(L,p)| = \sqrt{(t_{min}-t_p)^2 + (y_{0_1} + a_1*t_{min} - y_{p_1})^2 + (y_{0_2} + a_2*t_{min} - y_{p_2})^2 + (y_{0_3} + a_3*t_{min} - y_{p_3})^2 +}$ | 8 |

Any of the equations shown in Table 1 and Table 2, and further similarly-derived equations for higher values of (N), simplified set of data 222, which is more computationally efficient than making a separate comparison to a separate threshold value for several separate data types. Thus, it is more computationally efficient to simplify a multidimensional signal than it is to simplify several unidimensional signals containing the same data, as would be the case when applying the Ramer-Douglas-Peucker algorithm to several unidimensional signals.

At block 408, the controller 230 selects the point in the target set of data 205 that has the largest minimum distance to the reference line. With reference to FIG. 5A, this is the sample point (p-0) shown, which is minimally distant from the reference line (L-0) by the distance (R-0).

At block 410, the controller 230 determines whether the largest minimum distance is greater than a threshold. With reference to FIG. 5A, the distance (R-0) is checked against the threshold distance (Z). The threshold distance (Z) may be referred to as the "curve error", as it denotes the amount by which it is considered acceptable for the simplified multidimensional signal 224 (i.e., the simplified curve) to vary from the raw data 204.

The threshold distance (Z) may be predetermined based on a desired degree to which the target set of data 205 is to be simplified. A larger value (Z) may result in greater degree simplification, and a lower value (Z) may result in a lesser degree of simplification.

In cases in which the target set of data 205 contains at least two data types that are recorded in different units, the determination of whether the threshold value (Z) is exceeded may be influenced by the units that each data type is measured in. For example, where $(Y_1)$ is Z accelerometer data and $(Y_2)$ is vehicle speed data, the value of $(Y_2)$ can be expected to vary more widely than the value of $(Y_1)$. Even in some cases in which the target set of data 205 contains two signals that are of the same data type, but are measured in different units (e.g., one temperature sensor measures temperature in degrees Celsius and another temperature sensor measures temperature in degrees Fahrenheit), one signal may have more influence on whether the threshold value (Z) is met than another. To correct for such skew in the data, the method 400 may involve scaling the units of at least one dimension of the multidimensional signal 206 prior to determination of the minimum distances so that the effect that each dimension has on whether the threshold distance (Z) is met can be controlled. For example, where $(Y_1)$ is Z accelerometer data and $(Y_2)$ is vehicle speed data, the value of $(Y_2)$ can be expected to vary more widely than the value of $(Y_1)$, and thus the $(Y_1)$ dimension may have a scaling factor (e.g., a factor of 5) applied to it, so that each data type may have a comparable amount of impact on whether the threshold value (Z) is met. A scaling factor may also be applied to the time dimension so that the effect that the time dimension (and the units it is recorded in) has on whether the threshold distance (Z) is met can be controlled. Thus, the dataset simplification algorithm may involve the application of single threshold value (Z), as opposed to multiple threshold values (Z) for separate signals, the multidimensional signal 206 may be simplified in a computationally efficient manner.

In cases in which all of the data types included in the multidimensional signal 206 are of the same data type and are measured in the same units (e.g., where $(Y_1)$ is X accelerometer data measured in (g) and $(Y_2)$ is Y accelerometer data measured in (g)), the threshold value (Z) need not be scaled with respect to either dimension of the multidimensional signal 206.

The selection of the threshold value (Z) may depend on a maximum acceptable error for any one, or combination of, signals in the multidimensional signal 206. For example, each signal may scaled down (or up, as the case may be) according to the maximum acceptable error for each other signal in the multidimensional signal 206. As a numerical example, if the multidimensional signal 206 includes accelerometer data for which there is a maximum allowable error of +/−10 $m/s^2$ (and the accelerometer data is measured in $m/s^2$), and the multidimensional signal 206 further includes vehicle speed data for which there is a maximum allowable error of +/−1 km/h (and the vehicle speed data is measured in km/h), then the signal for the accelerometer data may be scaled down by a ratio of 1/10 (i.e., the ratio of the maximum acceptable error of the other signal divided by the maximum acceptable error of the signal).

In general, if the point with the largest minimum distance is less than the threshold, then the method 400 is ended. If the point with the largest minimum distance is greater than the threshold, the method 400 proceeds to block 412.

At block 412, the controller 230 logs the selected point, which has the largest minimum distance to the reference line, to be included in the simplified set of data 222 for transmission to a telematics system. With reference to FIG. 5A, it can be seen that the distance (R−0) from the sample point (p−0) to the reference line (L−0) is greater than the threshold value (Z), and thus the sample point (p−0) is saved for inclusion in the simplified set of data 222.

In general, if the target set of data 205 can be further subdivided, blocks 402 to 412 may then be repeated on such subdivided portions. At block 414, the controller 230 determines whether the target set of data 205 can be subdivided into smaller subdivided portions. If the target set of data 205 cannot be divided into smaller subdivided portions, such as, for example, if there are no further points in the target set of data 205 that can form a subdivided portion, or if there are no data points in the target set of data 205 that are more distant to the reference line than the threshold value, then the method 400 is ended. If the target set of data 205 can be subdivided, then the method 400 proceeds to block 416.

At block 416, the target set of data 205 is subdivided into smaller subdivided portions. Each subdivided portion is bounded by either the first point in the higher level target set of data 205 (e.g., point (a), a to-be-saved point (e.g., the previously saved point (p−0), or the last point in the higher level target set of data 205 (e.g., point (b)), as the case may be. For each subdivided portion, the reference line to be used for evaluation of the minimum distances is a line defined between the first point and the last point of that subdivided portion. The method 400 may be repeated this way for increasingly smaller subdivided portions of the target set if data 205 until there are no points in any subdivided portion that are minimally distant from the respective reference line of that subdivided portion by at least the threshold value. Thus, the target set of data 205 is reduced to a simplified set of data 222. FIGS. 5B, 5C, 6A, 6B, and 6C further illustrate the above-described iterative process.

Figure 5B:
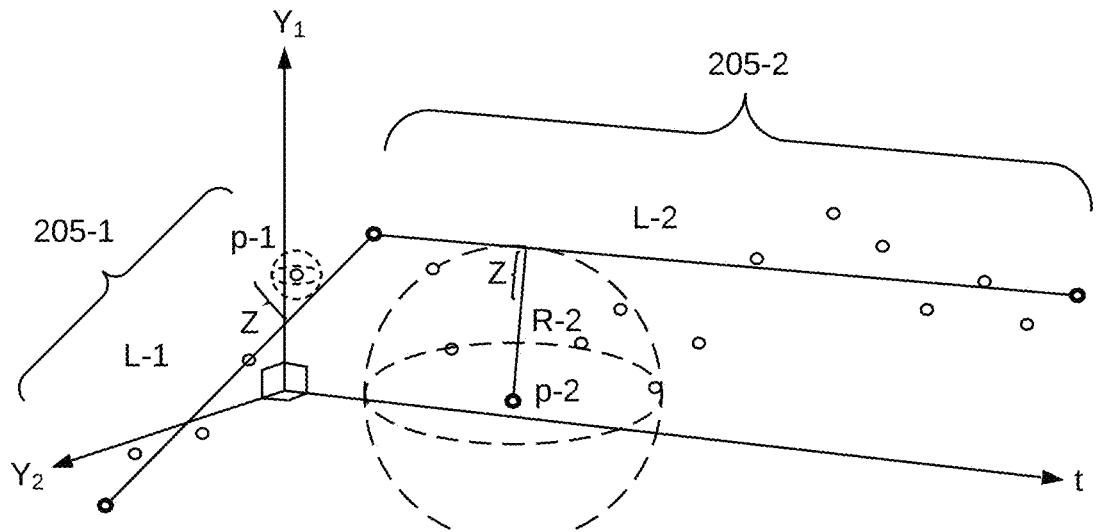

In FIG. 5B, the original target set of data 205, through which the original reference line (L−0) was defined, is divided into two subdivided portions, 205-1 and 205-2, through each of which is defined a new respective reference line (L−1), (L−2), respectively. The original target set of data 205 may be referred to as the higher level target set of data, and each of the subdivided portions 205-1 and 205-2 may be referred to as subdivided portions thereof. In the target set of data 205-1, the sample point (p−1) having the greatest minimum distance to the reference line (L−1) is not more distant from the reference line (L−1) than the threshold value (2), and thus this sample point (p−1) is not saved for inclusion in the simplified set of data 222. In the target set of data 205-2, the sample point (p−2) having the greatest minimum distance to the reference line (L−2) is more distant (R−2) from the reference line (L−2) than the threshold value (2), and thus this sample point (p−2) is saved for inclusion in the simplified set of data 222. Since there are no points in the target set of data 205-1 that are more distant to the reference line (L−1) than the threshold value (2), the target set of data 205-1 cannot be further reduced into a further subdivided portion.

Figure 5C:
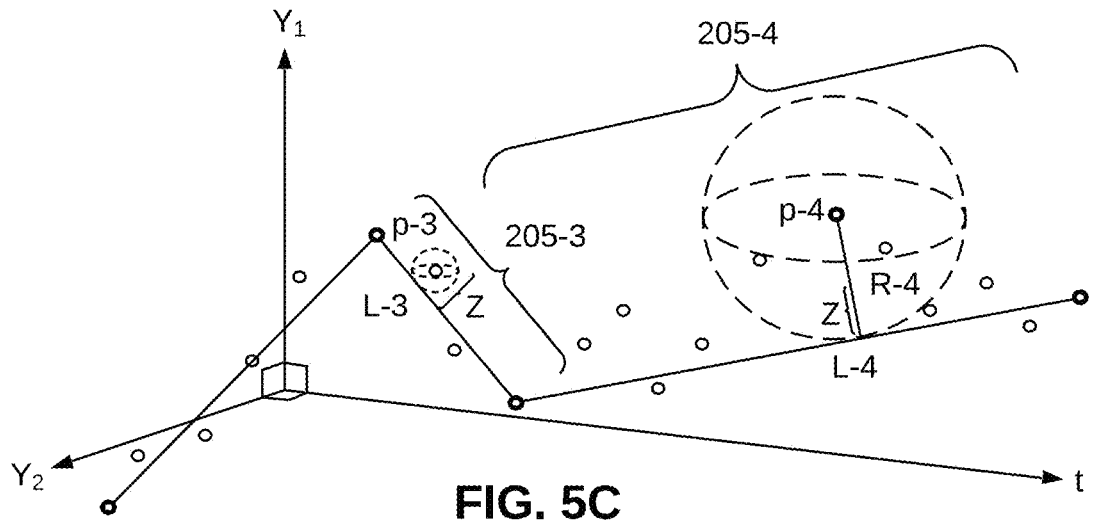

In FIG. 5C, the target set of data 205-2 is divided into two subdivided portions, 205-3 and 205-4, through each of which is defined a new respective reference line (L−3), (L−4), respectively. In the target set of data 205-3, the sample point (p−3) having the greatest minimum distance to the reference line (L−3) is not more distant from the reference line (L−3) than the threshold value (Z), and thus this sample point (p−3) is not saved for inclusion in the simplified set of data 222. In the target set of data 205-4, the sample point (p−4) having the greatest minimum distance to the reference line (L−4) is more distant (R−4) from the reference line (L−4) than the threshold value (Z), and thus this sample point (p−4) is saved for inclusion in the simplified set of data 222. Since there are no points in the target set of data 205-3 that are more distant to the reference line (L-3) than the threshold value (Z), the target set of data 205-3 cannot be further reduced into a further subdivided portion.

Figure 6A:
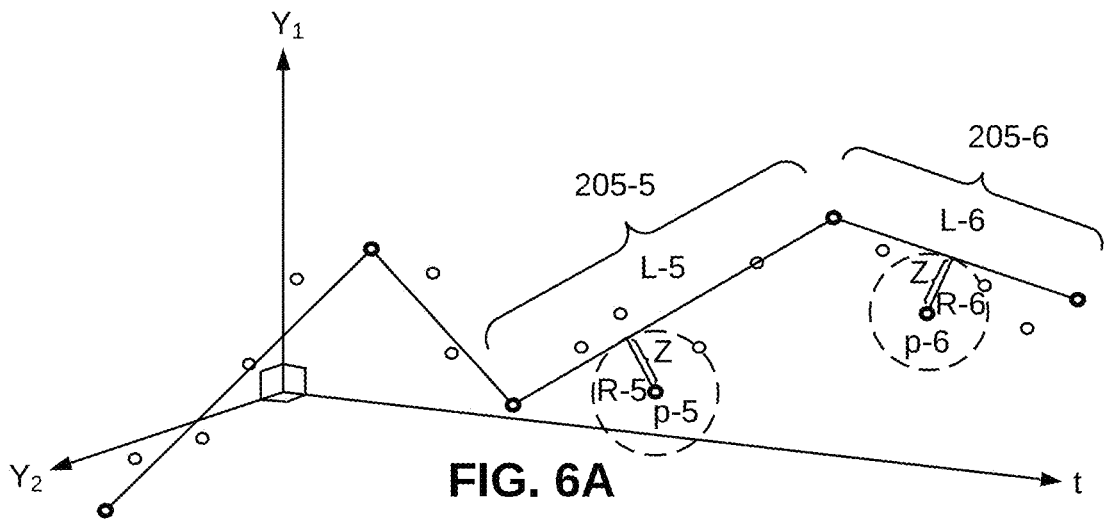
Figure 6B:
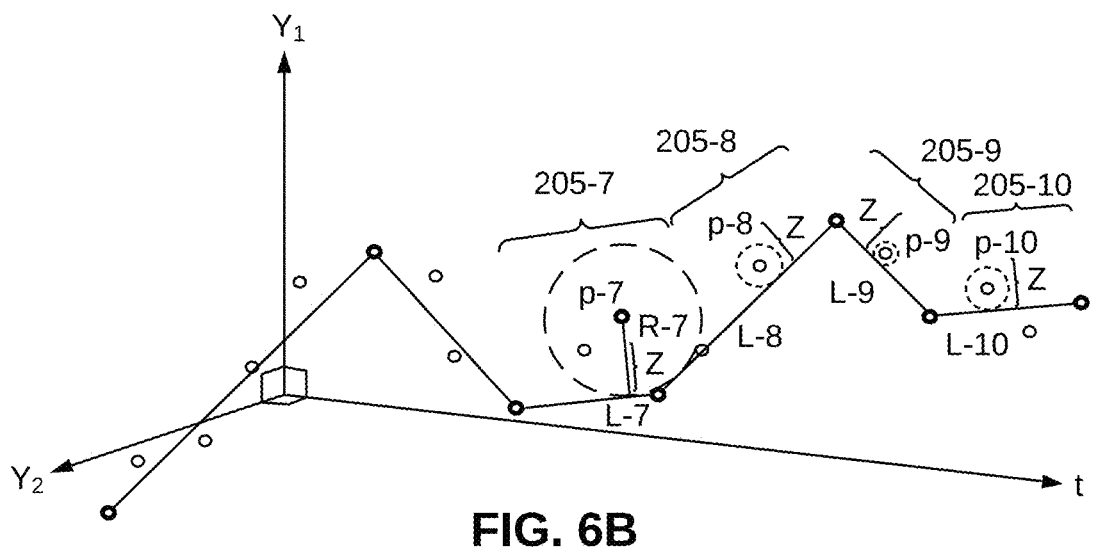
Figure 6C:
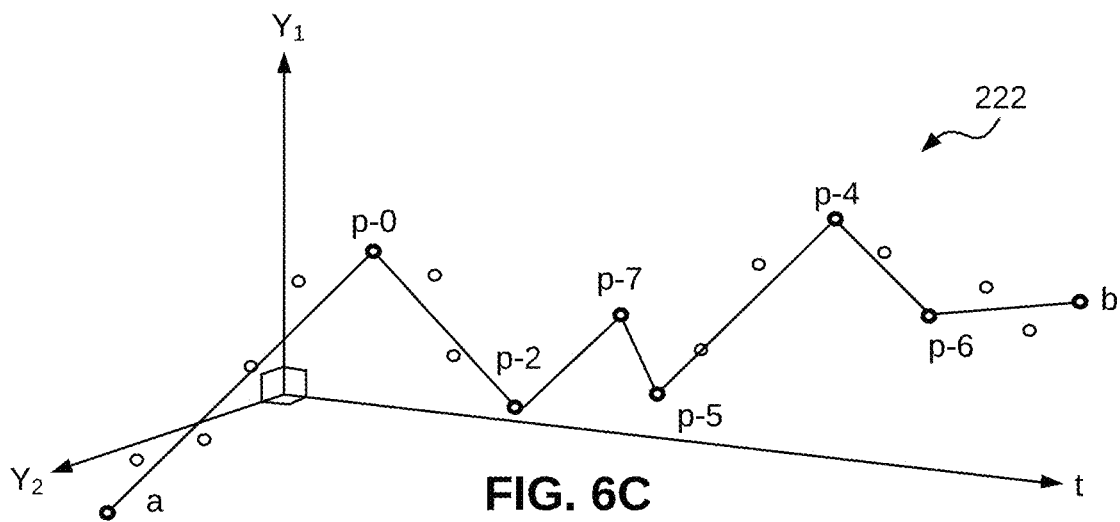

Similarly, in FIG. 6A, the target set of data 205-4 is divided into two subdivided portions, 205-5 and 205-6, through each of which is defined a new respective reference line (L-5), (L-6), respectively, and for which the sample points (p-5) and (p-6) that are minimally distant to the respective lines (L-5), (L-6), are more distant than the threshold (Z), and are saved for inclusion in the simplified set of data 222. Further, in FIG. 6B, the target sets of data 205-6 and 205-6 are divided into further subdivided portions 205-7, 205-8, 205-9, and 205-10, from which only the sample point (p-7), which is minimally distant from its reference line (L-7) by a distance greater than the threshold value (Z), is saved to be included in the simplified set of data 222. In FIG. 6C, the completed simplified set of data 222 is shown, which includes points (p-0), (p-2), (p-4), (p-5), (p-6), (p-7), and which is not reducible to any further subdivided portions. The remaining points from the raw target set of data 205 that are not included in the simplified set of data 222 are discarded.

Thus, the asset tracking device 200 (or the asset itself) may collect raw data 204 that contains a target set of data 205 that includes a multidimensional signal 206 of a plurality of different data types, and perform a dimensionally generalized dataset simplification algorithm on the multidimensional signal 206 to simplify the data in a computationally efficient manner prior to transmission to its telematics system.

Further, by performing a dataset simplification algorithm on a multidimensional signal rather than on a series of unidimensional signals, the asset tracking device 200 may make more accurate determinations as to which points are the most significant points, which may result in more reliable data collection for its telematics system.

The data types that are included in the target set of data 205, and thus in the multidimensional signal 206, may be set out in the dimensionally generalized dataset simplification instructions 234. That is, the dimensionally generalized dataset simplification instructions 234 may include instructions for the controller 230 to identify the individual threads of data in the raw data 204 that are to be bundled together into a target set of data 205, and may further include instructions to flag such data or compile such data so that it may be processed through a dimensionally generalized dataset simplification algorithm.

A target set of data 205 may include data types that are obtained from the same data source. In many cases, such data types may each be recorded in the same units, which simplifies calculations in the dataset simplification algorithm. For example, X, Y, and Z accelerometer signals may all be obtained from an accelerometer onboard the asset tracking device 200 and may all be recorded in standard gravity units (i.e., g)).

However, another target set of data 205 may include data types that are not directly related, and which may be obtained from different data sources, but which may be indirectly related in a physical or logistical way. For example, a target set of data 205 may include a positional data type such as latitudinal position and longitudinal position, and a speed data type such as vehicle speed. The positional data may be obtained from a locating device onboard the asset tracking device 200 (e.g., a GPS module), and the vehicle speed data may be obtained through an onboard diagnostic port of the asset 202. Although collected from different sources, these data types may be related, in that position may be impacted by vehicle speed, and vice versa. Since these data types are indirectly related in some physical or logistical way, these data types may exhibit similar signal patterns. For example, each of these data types may go through periods of relative activity and inactivity during the same periods of time (e.g., each data type may show high periods of activity during periods of acceleration, which results in many data points being saved, and periods of low activity during periods of smooth driving, which results in few data points being saved). It may be particularly advantageous to bundle together such related data types for streamlined dataset simplification in a target set of data 205 so that the controller 230 performs a dataset simplification algorithm over each period of relative activity and inactivity only once, rather than having the controller 230 do the work to rediscover, for each data type independently, that each data type goes through substantially synchronous periods of relative activity and inactivity. Thus, bundling together indirectly related data types, may achieve further computational efficiencies. In order to perform a multidimensional dataset simplification algorithm on unrelated (or related) data types, the data may be scaled, as discussed above, and a common threshold value for simplification can be used for each data type.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
    obtaining, at a telematics device onboard an asset, the asset being a vehicle or associated with a vehicle, raw data;
    when a data logging trigger is satisfied, with the telematics device onboard the asset, reducing a target set of data within the raw data into a simplified set of data, wherein:
        the target set of data contains at least a first dimension for a sequence of time values, a second dimension for a first type of data collected with respect to the sequence of time values, and a third dimension for a second type of data collected with respect to the sequence of time values; and
        reducing the target set of data into the simplified set of data comprises applying, to the target set of data, a modified Ramer-Douglas-Peucker algorithm in which points are selected from the target set of data for inclusion in the simplified set of data based on distances of the points to iteratively-defined reference lines defined through portions of the target set of data in n-dimensional space, where n is three or greater; and
    transmitting the simplified set of data from the telematics device to a server for provision of a telematics service.

2. The method of claim 1, wherein:
    the distances of the points to the iteratively-defined reference lines are minimum distances in the n-dimensional space where n is three or greater; and
    determination of a minimum distance for a sample point in the target set of data to a reference line comprises:
        determining a reference point on the reference line that is minimally distant from that sample point by evaluating $t_{min}$ in the following equation:

$$\frac{t_p + \sum_{n=1}^{N}(y_{p_n} - y_{0_n}) * a_n}{1 + \sum_{n=1}^{N} a_n^2}$$

wherein,
- $t_p$ represents the time value (t) at the sample point (p),
- N represents the total number of non-time dimensions in the multidimensional signal,
- n represents the $n^{th}$ non-time dimension in the multidimensional signal,
- $y_{p_n}$ represents the value (y) of the sample point (p) in the $n^{th}$ dimension (n),
- $y_{0_n}$ represents the value (y) of the first point (0) in the $n^{th}$ dimension (n), the first point (0) being first with respect to time,
- $a_n$ represents the slope (a) of the reference line in the $n^{th}$ dimension (n) with respect to time, and
- $t_{min}$ represents the time (t) at the reference point, the point at which the reference line is minimally distant (min) from the sample point; and determining the distance from that sample point to the reference point by the following equation:

$$|R(L,p)| = \sqrt{(t_{min} - t_p)^2 + \sum_{n=1}^{N}(y_{0_n} + a_n * t_{min} - y_{p_n})^2}$$

wherein,
- $t_{min}$, $t_p$, N, n, $y_{0_n}$, $a_n$, and $y_{p_n}$ are defined as in the previous equation, and
- |R(L,p)| represents the distance (R) from the sample point (p) to the reference point on the reference line (L).

3. The method of claim 1, wherein:
the first type of data and the second type of data are recorded in different units, and
the method further comprises scaling the units of one or both of the first type of data and the second type of data prior to reduction of the target set of data into the simplified set of data.

4. The method of claim 1, wherein the first type of data includes a latitudinal position of the asset and the second type of data includes a longitudinal position of the asset.

5. The method of claim 4, wherein the target set of data further includes a fourth dimension for a third type of data that includes an altitudinal position of the asset.

6. The method of claim 1, wherein:
the first type of data includes an accelerometer signal in an X direction,
the second type of data includes an accelerometer signal in a Y direction,
the target set of data further includes a fourth dimension for a third type of data, and
the third type of data includes an accelerometer signal in a Z direction.

7. The method of claim 1, wherein the raw data is obtained from a data source that includes one or more of: an onboard diagnostic port of the asset or a sensor of the asset tracking device.

8. The method of claim 1, wherein the telematics device is integrated into the asset.

9. A telematics device for use onboard an asset, the telematics device comprising:
an interface layer to obtain raw data from a data source onboard the asset, the asset being a vehicle or associated with a vehicle;
a memory to store the raw data;
a controller to:
when a data logging trigger is satisfied with the controller of the telematics device, reduce a target set of data within the raw data into a simplified set of data, wherein:
the target set of data contains at least a first dimension for a sequence of time values, a second dimension for a first type of data collected with respect to the sequence of time values, and a third dimension for a second type of data collected with respect to the sequence of time values; and
reducing the target set of data into the simplified set of data involves applying, to the target set of data a modified Ramer-Douglas-Peucker algorithm in which points are selected from the target set of data for inclusion in the simplified set of data based on distances of the points to iteratively-defined reference lines defined through portions of the target set of data in n-dimensional space, where n is three or greater; and
a communication interface to transmit the simplified set of data from the telematics device to a server for provision of a telematics service.

10. The telematics device of claim 9, wherein the first type of data and the second type of data are recorded in different units, and the units of one or both of the first type of data and the second type of data are scaled prior to reduction of the target set of data into the simplified set of data.

11. The telematics device of claim 9, wherein:
the distances are minimum distances in n-dimensional space, n being three or greater; and
determination of a minimum distance for a sample point in the target set of data to a reference line comprises:
determining a reference point on the reference line that is minimally distant from that sample point by evaluating $t_{min}$ in the following equation:

$$t_{min} = \frac{t_p + \sum_{n=1}^{N}(y_{p_n} - y_{0_n}) * a_n}{1 + \sum_{n=1}^{N} a_n^2}$$

wherein,
- $t_p$ represents the time value (t) at the sample point (p),
- N represents the total number of non-time dimensions in the target set of data, where N is two or greater,
- n represents the $n^{th}$ non-time dimension in the target set of data,
- $y_{p_n}$ represents the value (y) of the sample point (p) in the $n^{th}$ dimension (n),
- $y_{0_n}$ represents the value (y) of the first point (0) in the $n^{th}$ dimension (n), the first point (0) being first with respect to time,
- $a_n$ represents the slope (a) of the reference line in the n'h dimension (n) with respect to time, and $t_{min}$ represents the time (t) at the reference point, the point at which the reference line is minimally distant (min) from the sample point; and
determining the distance from that sample point to the reference point by the following equation:

$$|R(L, p)| = \sqrt{(t_{min} - t_p)^2 + \sum_{n=1}^{N} (y_{0_n} + a_n * t_{min} - y_{p_n})^2}$$

wherein,
$t_{min}$, $t_p$, N, n, $y_{0_n}$, $a_n$, and $y_{p_n}$ are defined as in the previous equation, and
$|R(L,p)|$ represents the distance (R) from the sample point (p) to the reference point on the reference line (L).

12. The telematics device of claim 9, wherein the telematics device is integrated into the asset.

13. The telematics device of claim 9, wherein the first type of data includes a latitudinal position of the asset and the second type of data includes a longitudinal position of the asset.

14. The telematics device of claim 9, wherein:
the first type of data includes an accelerometer signal in an X direction,
the second type of data includes an accelerometer signal in a Y direction,
the target set of data further includes a fourth dimension for a third type of data; and
the third type of data includes an accelerometer signal in a Z direction.

15. A system comprising:
a telematics device onboard an asset, the asset being a vehicle or associated with a vehicle, the telematics device configured to:
obtain raw data from a data source onboard the asset;
when a data logging trigger is satisfied, with the telematics device, reduce a target set of data within the raw data into a simplified set of data, wherein:
the target set of data contains at least a first dimension for a sequence of time values, a second dimension for a first type of data collected with respect to the sequence of time values, and a third dimension for a second type of data collected with respect to the sequence of time value;
reducing the target set of data into the simplified set of data involves applying, to the target set of data, a modified Ramer-Douglas-Peucker algorithm in which points are selected from the target set of data for inclusion in the simplified set of data based on distances of the points to iteratively-defined reference lines defined through portions of the target set of data in n-dimensional space, n being three or greater; and
transmit the simplified set of data from the telematics device;
one or more servers to:
receive the simplified set of data from the telematics device; and
record the simplified set of data in an asset tracking database for provision of a telematics service.

16. The system of claim 15, wherein the first type of data and the second type of data are recorded in different units, and one or both of the first type of data and the second type of data are scaled prior to reduction of the target set of data into the simplified set of data.

17. The system of claim 15, wherein the telematics device is integrated into the asset.

18. The system of claim 15, wherein:
the distances are minimum distances in the n-dimensional space, n being three or greater, and
determination of a minimum distance for a sample point in the target set of data to a reference line comprises:
determining a reference point on the reference line that is minimally distant from that sample point by evaluating $t_{min}$ in the following equation:

$$t_{min} = \frac{t_p + \sum_{n=1}^{N} (y_{p_n} - y_{0_n}) * a_n}{1 + \sum_{n=1}^{N} a_n^2}$$

wherein,
$t_p$ represents the time value (t) at the sample point (p),
N represents the total number of non-time dimensions in the target set of data, where N is two or greater,
n represents the $n^{th}$ non-time dimension in the target set of data,
$y_{p_n}$ represents the value (y) of the sample point (p) in the $n^{th}$ dimension (n),
$y_{0_n}$ represents the value (y) of the first point (0) in the $n^{th}$ dimension (n), the first point (0) being first with respect to time,
$a_n$ represents the slope (a) of the reference line in the $n^{th}$ dimension (n) with respect to time, and
$t_{min}$ represents the time (t) at the reference point, the point at which the reference line is minimally distant (min) from the sample point; and
determining the distance from that sample point to the reference point by the following equation:

$$|R(L, p)| = \sqrt{(t_{min} - t_p)^2 + \sum_{n=1}^{N} (y_{0_n} + a_n * t_{min} - y_{p_n})^2}$$

wherein,
$t_{min}$, $t_p$, N, n, $y_{0_n}$, $a_n$, and $y_{p_n}$ are defined as in the previous equation, and
$|R(L,p)|$ represents the distance (R) from the sample point (p) to the reference point on the reference line (L).

19. The system of claim 15, wherein the first type of data includes a latitudinal position of the asset and the second type of data includes a longitudinal position of the asset.

20. The system of claim 15, wherein:
the first type of data includes an accelerometer signal in an X direction;
the second type of data includes an accelerometer signal in a Y direction;
the target set of data further includes a fourth dimension for a third type of data; and
the third type of data includes an accelerometer signal in a Z direction.

* * * * *

UNITED STATES PATENT AND TRADEMARK OFFICE
CERTIFICATE OF CORRECTION

| | | |
|---|---|---|
| PATENT NO. | : 11,022,444 B1 | Page 1 of 1 |
| APPLICATION NO. | : 16/928064 | |
| DATED | : June 1, 2021 | |
| INVENTOR(S) | : Ulf Bjorkengren | |

It is certified that error appears in the above-identified patent and that said Letters Patent is hereby corrected as shown below:

In the Specification

At Column 1, Line 8, please delete "35 U.S.C. § 1.119(e)" and replace with --35 U.S.C. § 119(e)--

Signed and Sealed this
Seventh Day of September, 2021

Drew Hirshfeld
*Performing the Functions and Duties of the
Under Secretary of Commerce for Intellectual Property and
Director of the United States Patent and Trademark Office*